United States Patent
Wang et al.

(10) Patent No.: US 10,644,475 B2
(45) Date of Patent: May 5, 2020

(54) RANDOM DISTRIBUTED RAYLEIGH FEEDBACK FIBER LASER BASED ON DOUBLE-CLADDING WEAKLY YTTERBIUM-DOPED FIBER

(71) Applicant: University of Electronic Science and Technology of China, Chengdu, Sichuan (CN)

(72) Inventors: Zinan Wang, Sichuan (CN); Jiaqi Li, Sichuan (CN); Han Wu, Sichuan (CN); Yunjiang Rao, Sichuan (CN)

(73) Assignee: University of Electronic Science and Technology of China, Chengdu, Sichuan (CN)

( * ) Notice: Subject to any disclaimer, the term of this patent is extended or adjusted under 35 U.S.C. 154(b) by 0 days.

(21) Appl. No.: 16/112,516

(22) Filed: Aug. 24, 2018

(65) Prior Publication Data
US 2018/0366897 A1    Dec. 20, 2018

(30) Foreign Application Priority Data
Jul. 9, 2018    (CN) .......................... 2018 1 0743349

(51) Int. Cl.
*H01S 3/067* (2006.01)
*H01S 3/094* (2006.01)
*H01S 3/16* (2006.01)

(52) U.S. Cl.
CPC ........ *H01S 3/0675* (2013.01); *H01S 3/06708* (2013.01); *H01S 3/06745* (2013.01);
(Continued)

(58) Field of Classification Search
CPC ............... H01S 3/0675; H01S 3/06745; H01S 3/06779; H01S 3/06708; H01S 2301/03;
(Continued)

(56) References Cited

U.S. PATENT DOCUMENTS 7,539,231 B1 * 5/2009 Honea ................. H01S 3/06795
    359/333
7,764,720 B1 * 7/2010 Bronder ............. H01S 3/06754
    372/3

(Continued)

OTHER PUBLICATIONS

D. V. Churkin et al. ("Raman fiber lasers with a random distributed feedback based on Rayleigh scattering," The American Physical Society, Physical Review A 82, 033828-1 to 033828-7, 2010) (Year: 2010).*

*Primary Examiner* — Yuanda Zhang (57) ABSTRACT

A random distributed Rayleigh feedback fiber laser based on a double-cladding weakly ytterbium-doped fiber includes: a pump laser source, a pump combiner, a cladding power stripper, and a double-cladding weakly ytterbium-doped fiber for simultaneously achieving distributed active gain and random distributed Rayleigh feedback. An output end of the pump combiner is connected with one end of the double-cladding weakly ytterbium-doped fiber, the other end of the double-cladding weakly ytterbium-doped fiber is connected with an input end of the cladding power stripper, and a concentration of ytterbium ions in the double-cladding weakly ytterbium-doped fiber is in a range of $0.5 \times 10^{23}$ to $1 \times 10^{25}/m^3$. The laser provided by the present invention solves the problem that the existing random fiber lasers cannot simultaneously utilize distributed active gain and random distributed Rayleigh feedback with a single type of fiber.

3 Claims, 3 Drawing Sheets

(52) U.S. Cl.
CPC .... *H01S 3/06779* (2013.01); *H01S 3/094007* (2013.01); *H01S 3/1618* (2013.01); *H01S 2301/03* (2013.01)

(58) Field of Classification Search
CPC .. H01S 3/1618; H01S 3/094007; H01S 3/302; H01S 3/06716
See application file for complete search history.

(56) References Cited

U.S. PATENT DOCUMENTS

| | | | |
|---|---|---|---|
| 8,472,486 B1* | 6/2013 | Henry | H01S 3/0675 372/3 |
| 8,646,426 B2* | 2/2014 | Finkenbiner | F01L 1/20 123/90.43 |
| 2008/0030847 A1* | 2/2008 | Murison | H01S 3/06754 359/341.3 |
| 2011/0134512 A1* | 6/2011 | Ahn | H01S 3/0675 359/341.3 |
| 2011/0305256 A1* | 12/2011 | Chann | G02B 27/0905 372/75 |
| 2015/0372442 A1* | 12/2015 | Dong | H01S 3/06708 372/6 |
| 2016/0111851 A1* | 4/2016 | Kliner | H01S 3/302 359/334 |

* cited by examiner

RANDOM DISTRIBUTED RAYLEIGH FEEDBACK FIBER LASER BASED ON DOUBLE-CLADDING WEAKLY YTTERBIUM-DOPED FIBER

CROSS REFERENCE OF RELATED APPLICATION

The present invention claims priority under 35 U.S.C. 119(a-d) to CN 201810743349.2, filed Jul. 9, 2018.

BACKGROUND OF THE PRESENT INVENTION

Field of Invention

The present invention relates to the field of optical fibers and fiber lasers, and more particularly to a random distributed Rayleigh feedback fiber laser based on a double-cladding weakly ytterbium-doped fiber.

Description of Related Arts

The fiber laser combines random distributed Rayleigh feedback and distributed active gain to achieve random laser. The pump light is coupled to the inner cladding of the fiber via a pump combiner. During the transmission process, the pump light repeatedly passes through the Ytterbium-doped core region, the doped ions in the ground state absorb the light to make energy transition to a metastable state; when the population inversion distribution is satisfied, the stimulated radiation occurs, and at the same time, the Rayleigh scattering in the fiber doped with ions provides enough random distributed feedback, thereby achieving random laser. Therefore, the fiber laser is actually a wavelength converter.

The spectral structure and the output power of random lasers have unique temperature insensitivity, and the light amplification of the random laser has a good gain flatness. Therefore, the random laser has important applications in the fields of optical fiber sensing and optical amplification. The earliest research obtained a random fiber laser through utilizing ordinary single-mode fiber of more than ten kilometers as a cavity, and the randomly distributed Rayleigh scattering in the fiber providing feedback for the random laser where in the fiber, no micro-nano particles were incorporated and no mirrors such as fiber gratings were written. The researches of traditional random fiber lasers mainly focused on the Raman gain, and then the fiber random fibers based on Brillouin gain, erbium-doped gain, Brillouin-Raman hybrid gain, active-Raman hybrid gain, etc. were also researched. There are two main feedback methods for random fiber lasers: one is based on random distributed Rayleigh scattering; the other is to write FBG (Fiber Bragg Grating) strings with random phase differences in the fiber; currently these two feedback methods can only be applied to the random lasers with their own gain types respectively; the gain of a random fiber laser based on a random distributed Rayleigh scattering feedback derives from nonlinear effects in the fiber, the active ion gain provided by the active fiber, or the hybrid gain of the active gain and the non-linear effect. For the fiber random laser, based on the random distributed feedback provided by the randomly written FBG string, the gain only originates from the active fiber. In addition, for the existing random fiber lasers adopting the fiber doped with high-concentration ions, the pump light is easily and rapidly absorbed during transmission, the loss is quite large; and the length of the fiber is not long enough, and the Rayleigh backscattering intensity in the fiber is weak, which makes it impossible to provide sufficient feedback. Therefore, it is advantageous to provide a random fiber laser based on distributed active gain and random distributed Rayleigh feedback.

SUMMARY OF THE PRESENT INVENTION

An object of the present invention is to provide a random distributed Rayleigh feedback fiber laser based on a double-cladding weakly ytterbium-doped fiber, which utilizes a single type of fiber simultaneously providing both distributed active gain and random distributed Rayleigh feedback to achieve random laser.

To solve the above technical problem, the present invention provides technical solutions as follows.

A random distributed Rayleigh feedback fiber laser based on a double-cladding weakly ytterbium-doped fiber comprises: a pump laser source, a pump combiner, a cladding power stripper, and a double-cladding weakly ytterbium-doped fiber for simultaneously obtaining distributed active gain and random distributed Rayleigh feedback, wherein: the pump laser source is connected with an input end of the pump combiner, an output end of the pump combiner is connected with one end of the double-cladding weakly ytterbium-doped fiber, the other end of the double-cladding weakly ytterbium-doped fiber is connected with an input end of the cladding power stripper, and a concentration of ytterbium ions in the double-cladding weakly ytterbium-doped fiber is in a range of $0.5 \times 10^{23}$ to $1 \times 10^{25}/m^3$.

Preferably, the double-cladding weakly ytterbium-doped fiber comprises an outer cladding layer, an inner cladding layer and a fiber core from outside to inside in sequence.

Preferably, the random distributed Rayleigh feedback fiber laser further comprises an FBG (Fiber Bragg Grating) for enhancing laser feedback, wherein the FBG is connected with a signal end of the pump combiner or an output end of the cladding power stripper.

Preferably, a length of the double-cladding weakly ytterbium-doped fiber is in a range of 80 to 300 m, and a wavelength of the FBG is in a range of 1015 to 1150 nm.

Preferably, a length of the double-cladding weakly ytterbium-doped fiber is in a range of 200 to 3000 m, and a wavelength of the FBG is in a range of 1015 to 1150 nm.

Preferably, the random distributed Rayleigh feedback fiber laser further comprises an FBG-A and an FBG-B both of which are adapted for forming a first-order second-order laser semi-open cavity structure to enhance first-order second-order feedback; a signal end of the pump combiner is connected with one end of the FBG-A, the other end of the FBG-A is connected with the FBG-B.

Preferably, a length of the double-cladding weakly ytterbium-doped fiber is in a range of 100 to 3000 m, a wavelength of the FBG-A is in a range of 1015 to 1150 nm, and a wavelength of the FBG-B is in a range of 1065-1300 nm.

Also, the present invention provides a random distributed Rayleigh feedback fiber laser based on a double-cladding weakly ytterbium-doped fiber, which comprises: a pump laser source, a pump combiner, a cladding power stripper, a double-cladding weakly ytterbium-doped fiber with a larger core diameter, and an FBG, wherein: a concentration of ytterbium ions in the double-cladding weakly ytterbium-doped fiber is in a range of $8 \times 10^{25}$-$1 \times 10^{27}/m^3$, an output end of the pump combiner is connected with one end of the double-cladding weakly ytterbium-doped fiber with the larger core diameter, the other end of the double-cladding weakly ytterbium-doped fiber with the larger core diameter is connected with an input end of the cladding power stripper, and a signal end of the pump combiner is connected with the FBG.

Preferably, a length of the double-cladding weakly ytterbium-doped fiber with the larger core diameter is in a range of 200 to 1000 m, and a wavelength of the FBG is in a range of 1015 to 1150 nm.

Preferably, the double-cladding weakly ytterbium-doped fiber with the larger core diameter comprises a fiber core and a cladding layer from inside to outside in sequence, wherein a diameter of the fiber core is in a range of 15-30 μm, and a diameter of the cladding layer is in a range of 125-600 μm.

In summary, through the above technical solutions, the present invention obtains some beneficial effects as follows.

(1) The fiber core of the double-cladding weakly ytterbium-doped fiber provided by the present invention is doped with low concentration of ytterbium ions, so when the pump light with a certain power is transmitted along the fiber, the pump light does not decay rapidly with the transmission distance of the fiber, and the signal light is able to be amplified within a relatively long distance range; in addition, due to the intrinsic random fluctuation of the density of the double-cladding weakly ytterbium-doped fiber, the refractive index randomly fluctuates, so when the signal light is transmitted in the double-cladding weakly ytterbium-doped fiber, random distributed Rayleigh scattering occurs, the sum of the backward Rayleigh scattering intensity of the fiber with a certain length is able to provide adequate feedback for laser lasing under the effect of the distributed active gain, which solves the problem that the existing random fiber lasers cannot achieve random laser only basing on a single type of fiber to provide both distributed active gain and random distributed Rayleigh feedback, so as to achieve an effect that both the distributed active gain and the random distributed Rayleigh feedback are simultaneously provided using a single type of fiber.

(2) The double-cladding weakly ytterbium-doped fiber provided by the present invention has a double-cladding fiber structure to achieve cladding pumping, which is conductive to introducing a higher pump power and reducing technical requirements for pump sources; and moreover, the diameter of the inner cladding layer is larger than that of the fiber core, so as to effectively suppress the nonlinear effect of the pump light for ensuring the stable output of the laser.

(3) The gain of the random distributed Rayleigh feedback fiber laser based on the double-cladding weakly ytterbium-doped fiber, provided by the present invention, is derived from active particles, so as to effectively reduce the lasing threshold and improve the ability to acquire laser.

(4) In the random distributed Rayleigh feedback fiber laser based on the double-cladding weakly ytterbium-doped fiber provided by the present invention, the high-power pump light is coupled to the inner cladding layer of the double-cladding weakly ytterbium-doped fiber through the pump combiner for transmission, the pump light repeatedly passes through the fiber core, the ytterbium ions in the fiber core undergo the stimulated radiation effect to radiate the signal light, the signal light is transmitted in the long-enough fiber and the corresponding Rayleigh scattering occurs, in which the backward Rayleigh scattered light is amplified by the ytterbium ions to provide enough feedback for laser lasing, so as to achieve the lasing of the high-power random laser, for achieving an effect that both the distributed active gain and the random distributed Rayleigh feedback are simultaneously provided using a single type of fiber.

(5) The fiber laser based on the double-cladding weakly ytterbium-doped fiber, provided by the present invention, comprises an FBG for forming a semi-open cavity structure to enhance feedback of the laser, and simultaneously, the FBG has a narrow line width and a narrowing effect on the laser, thereby outputting a high-power random laser with a lower threshold and a narrower line width.

(6) The fiber laser based on the double-cladding weakly ytterbium-doped fiber, provided by the present invention, comprises two FBGs for forming a first-order second-order laser semi-open cavity structure, so as to simultaneously enhance the first-order second-order feedback and reduce the high-power second-order threshold.

(7) In the fiber laser based on the double-cladding weakly ytterbium-doped fiber provided by the present invention, the diameter of the cladding layer and the fiber core of the double-cladding weakly ytterbium-doped fiber is increased, so as to increase the damage threshold of the fiber, introduce a higher pump power, and meanwhile further suppress the nonlinear effects of fiber caused by the pump light and the first-order laser leading to the second-order laser generation suppressed, thereby outputting the first-order laser with higher power.

(8) In the present invention, the length of the fiber is changeable; when the fiber is long enough, and the first-order laser power in the fiber core is high enough, the stimulated Raman effect occurs in the fiber for providing the gain with high efficiency, so as to produce the lasing of high-power second-order laser under the effect of distributed Rayleigh feedback.

(9) In the present invention, through changing the central wavelength of the FBG, the wavelength of the second-order laser satisfies both within the ytterbium-doped and Raman gain spectra, so as to realize the high power output of the second-order laser under Raman ytterbium-doped mixed gain.

BRIEF DESCRIPTION OF THE DRAWINGS

In order to more clearly illustrate technical solutions of embodiments of the present invention, the drawings used in the embodiments will be briefly described as below. It should be understood that the following drawings show only certain embodiments of the present invention and are therefore not considered as limiting the protective scope of the present invention. For those skilled in the art, other relevant drawings can also be obtained according to these drawings without any creative work.

DRAWING REFERENCES

1: pump laser source; 2: pump combiner; 3: double-cladding weakly ytterbium-doped fiber; 4: cladding power stripper; 5: FBG (Fiber Bragg Grating); 6: FBG-A; 7: FBG-B; Pp: pump power; z: length of fiber; output power: laser power.

DETAILED DESCRIPTION OF THE PREFERRED EMBODIMENT

In order to more clearly understand objects, technical solutions and advantages of the present invention, the present invention will be further described in detail below with reference to the accompanying drawings and embodiments. It is understood that the specific embodiments described herein are merely illustrative of the present invention and are not intended to limit the present invention, that is, the described embodiments are only some of the embodiments of the present invention, and not all of the embodiments. Generally, the components of the embodiments of the present invention, which are described and illustrated in the drawings herein, may be arranged and designed in a variety of different configurations.

Therefore, the following detailed description of the embodiments of the present invention is not intended to limit the protective scope of the present invention, but is to merely show selected embodiments of the present invention. All other embodiments obtained by those skilled in the art based on the embodiments of the present invention without creative efforts are within the protective scope of the present invention.

It should be noted that the terms "first" and "second" and the like are used to distinguish one entity or operation from another entity or operation, and do not necessarily require or imply there is any such actual relationship or order between these entities or operations. Furthermore, the term "comprise", "include" or any other variants thereof is intended to encompass a non-exclusive inclusion, such that a process, method, article, or device that comprises a plurality of elements includes not only those elements but also other elements not explicitly listed, or includes inherent elements of such process, method, article, or device. Under the circumstance of no more restrictions, an element that is defined by the phrase "comprising a . . . " does not exclude the presence of additional equivalent elements in the process, method, article, or device that comprises the element.

Technical problem: The present invention solves the problem that the existing random fiber lasers are unable to provide both distributed active gain and random distributed Rayleigh feedback using a single type of fiber.

Figure 1:
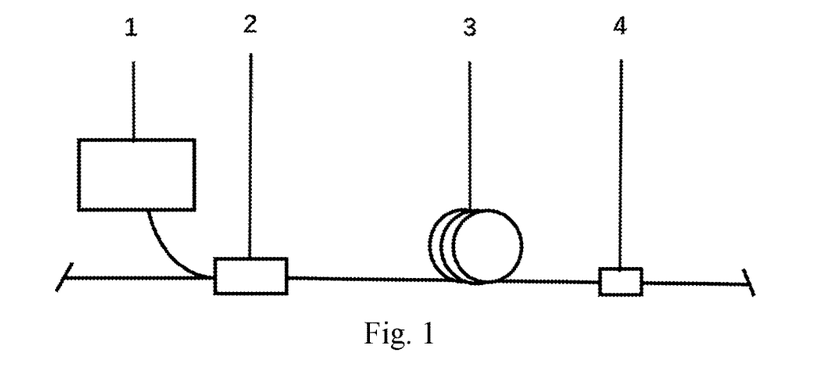
FIG. 1 is a structurally schematic view of a random distributed Rayleigh feedback fiber laser based on a double-cladding weakly ytterbium-doped fiber provided by the present invention according to a first embodiment of the present invention.

Technical Solutions:

A random distributed Rayleigh feedback fiber laser based on a double-cladding weakly ytterbium-doped fiber comprises: a pump laser source 1, a pump combiner 2, a cladding power stripper 4, and a double-cladding weakly ytterbium-doped fiber 3 for simultaneously obtaining distributed active gain and random distributed Rayleigh feedback, wherein: the pump laser source 1 is connected with an input end of the pump combiner 2, an output end of the pump combiner 2 is connected with one end of the double-cladding weakly ytterbium-doped fiber 3, the other end of the double-cladding weakly ytterbium-doped fiber 3 is connected with an input end of the cladding power stripper 4, and a concentration of ytterbium ions in the double-cladding weakly ytterbium-doped fiber 3 is in a range of $0.5 \times 10^{23}$ to $1 \times 10^{25}/m^3$.

The double-cladding weakly ytterbium-doped fiber 3 comprises an outer cladding layer, an inner cladding layer and a fiber core from outside to inside in sequence.

Figure 2:
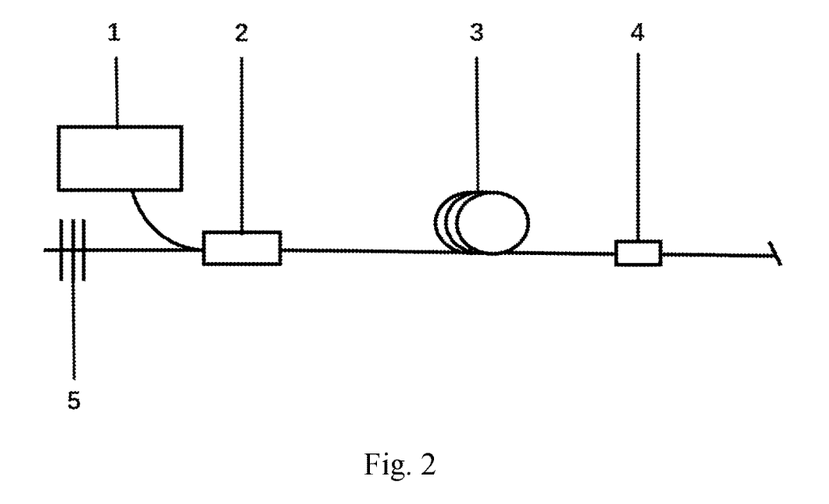
FIG. 2 is a structurally schematic view of a random distributed Rayleigh feedback fiber laser based on a double-cladding weakly ytterbium-doped fiber according to a second preferred embodiment of the present invention.
Figure 5:
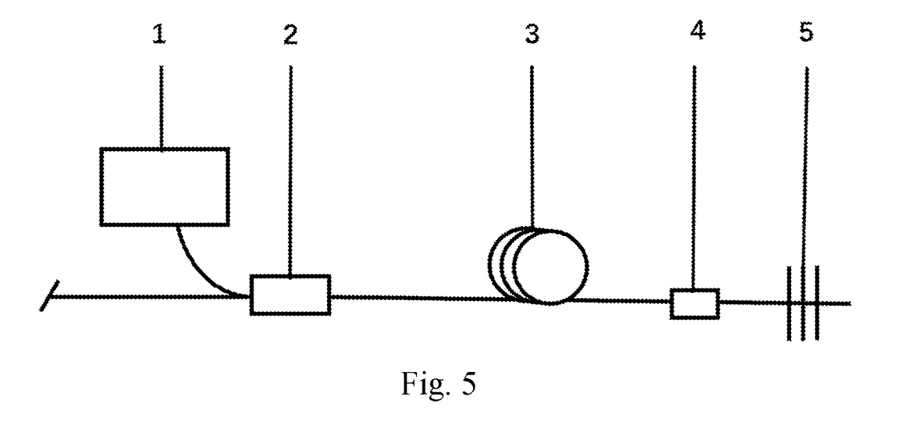
FIG. 5 is a structurally schematic view of a random distributed Rayleigh feedback fiber laser based on a double-cladding weakly ytterbium-doped fiber according to a fourth preferred embodiment of the present invention.

The random distributed Rayleigh feedback fiber laser further comprises an FBG (Fiber Bragg Grating) 5 for enhancing laser feedback, wherein the FBG 5 is connected with a signal end of the pump combiner 2 or an output end of the cladding power stripper 4.

A length of the double-cladding weakly ytterbium-doped fiber 3 is in a range of 80 to 300 m, and a wavelength of the FBG 5 is in a range of 1015 to 1150 nm.

A length of the double-cladding weakly ytterbium-doped fiber 3 is in a range of 200 to 3000 m, and a wavelength of the FBG 5 is in a range of 1015 to 1150 nm.

Figure 6:
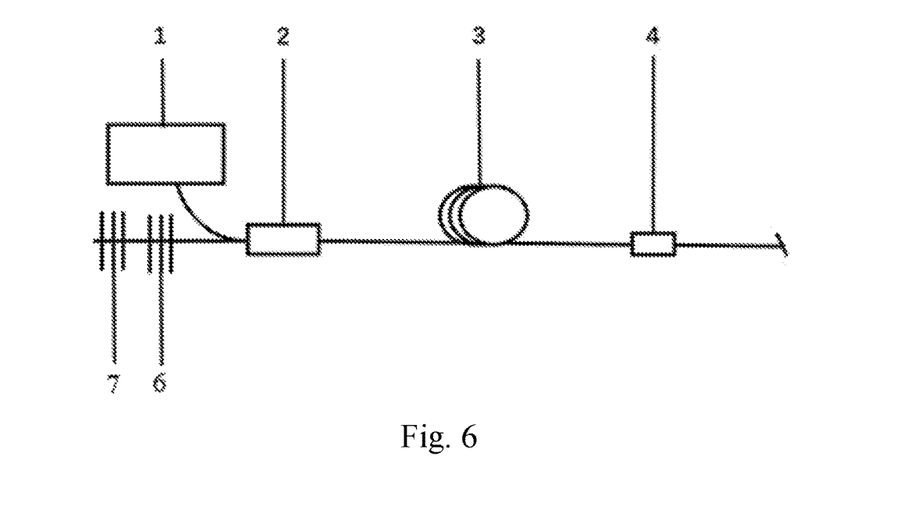
FIG. 6 is a structurally schematic view of a random distributed Rayleigh feedback fiber laser based on a double-cladding weakly ytterbium-doped fiber according to a fifth preferred embodiment of the present invention.

The random distributed Rayleigh feedback fiber laser further comprises an FBG-A 6 and an FBG-B 7 both of which are adapted for forming a first-order second-order laser semi-open cavity structure to enhance first-order second-order feedback; a signal end of the pump combiner 2 is connected with one end of the FBG-A 6, the other end of the FBG-A 6 is connected with the FBG-B 7.

A length of the double-cladding weakly ytterbium-doped fiber 3 is in a range of 100 to 3000 m, a wavelength of the FBG-A 6 is in a range of 1015 to 1150 nm, and a wavelength of the FBG-B 7 is in a range of 1065-1300 nm.

Figure 9:
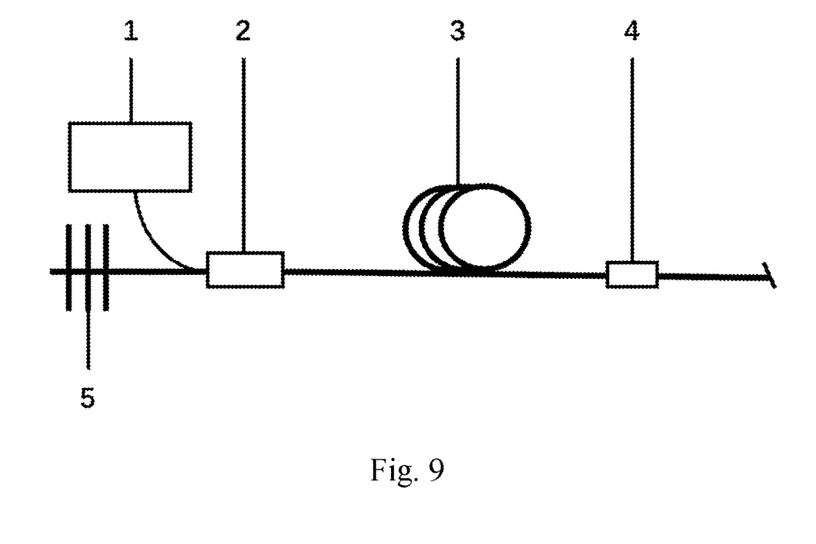
FIG. 9 is a structurally schematic view of a random distributed Rayleigh feedback fiber laser based on a double-cladding weakly ytterbium-doped fiber according to a seventh preferred embodiment of the present invention.

Also, the present invention provides a random distributed Rayleigh feedback fiber laser based on a double-cladding weakly ytterbium-doped fiber with a larger core diameter, which comprises: a pump laser source 1, a pump combiner 2, a cladding power stripper 4, a double-cladding weakly ytterbium-doped fiber 3 with a lager core diameter, and an FBG 5, wherein: a concentration of ytterbium ions in the double-cladding weakly ytterbium-doped fiber 3 is in a range of $8 \times 10^{25}$-$1 \times 10^{27}/m^3$, an output end of the pump combiner 2 is connected with one end of the double-cladding weakly ytterbium-doped fiber 3 with the larger core diameter, the other end of the double-cladding weakly ytterbium-doped fiber 3 with the larger core diameter is connected with an input end of the cladding power stripper 4, and a signal end of the pump combiner 2 is connected with the FBG 5.

A length of the double-cladding weakly ytterbium-doped fiber 3 with the larger core diameter is in a range of 200 to 1000 m, and a wavelength of the FBG 5 is in a range of 1015 to 1150 nm.

The double-cladding weakly ytterbium-doped fiber 3 with the larger core diameter comprises a fiber core and a cladding layer from inside to outside in sequence, wherein a diameter of the fiber core is in a range of 15-30 and a diameter of the cladding layer is in a range of 125-600 µm.

The working principle of the random distributed Rayleigh feedback fiber laser mentioned above is as follows.

The fiber core of the double-cladding weakly ytterbium-doped fiber 3 is doped with low concentration of ytterbium ions, when the pump light with a certain power is transmitted along the fiber, the pump light does not decay rapidly with the transmission distance of the fiber, the ytterbium ions in the core region absorb pump light and occurs stimulated radiation to radiate signal light; the signal light is able to be amplified within a relatively long distance range, thereby ensuring a long-distance distributed active gain. The random fluctuation of the refractive index produces random distributed Rayleigh scattering. Although the Rayleigh scattering coefficient is small, the double-cladding weakly ytterbium-doped fiber 3 adopted by the present invention is long enough, and the random distributed Rayleigh scattering in the fiber is able to provide adequate feedback for laser lasing, so as to achieve laser lasing, thereby achieving a single type of fiber providing both the distributed active gain and the random distributed Rayleigh feedback.

In the fiber laser based on the double-cladding weakly ytterbium-doped fiber provided by the present invention, the pump laser source 1 outputs the pump light, the pump light is introduced to the input end of the pump combiner 2 and then is outputted by the pump output end of the pump combiner 2, and then is introduced to the double-cladding weakly ytterbium-doped fiber 3; when the light is transmitted in the double-cladding weakly ytterbium-doped fiber 3, the ytterbium ions absorb the pump light to jump to a higher energy level; when the pump light is sufficiently large in power, the amount of particles transitioning to high energy levels is sufficient to achieve the population inversion, and the stimulated radiation occurs; at the same time, due to the random fluctuation of the refractive index, the random distributed Rayleigh scattering is produced. Although the Rayleigh scattering coefficient is small, the double-cladding weakly ytterbium-doped fiber provided by the present invention is long enough, so the Random distributed Rayleigh scattering in the fiber is able to provide sufficient feedback to form laser lasing. To strip residual pump power in the cladding layer, the tail end of the double-cladding weakly ytterbium-doped fiber 3 is connected with the cladding power stripper 4 to strip the pump light in the cladding layer, the output end of the cladding power stripper 4 acts as a forward output end of the laser.

Technical effects: The fiber core of the double-cladding weakly ytterbium-doped fiber 3 provided by the present invention is doped with low concentration of ytterbium ions, so when the pump light with a certain power is transmitted along the fiber, the pump light does not decay rapidly with the transmission distance of the fiber, and the signal light is able to be amplified within a relatively long distance range; in addition, due to the intrinsic random fluctuation of the density of the double-cladding weakly ytterbium-doped fiber, the refractive index randomly fluctuates, so when the signal light is transmitted in the double-cladding weakly ytterbium-doped fiber, random distributed Rayleigh scattering produces, the backward Rayleigh scattering plays an important role in laser lasing, the sum of the backward Rayleigh scattering intensity of the long-distance fiber is able to provide adequate feedback for laser lasing under the effect of the distributed active gain, which solves the problem that the existing random fiber lasers cannot achieve random laser only basing on a single type of fiber to provide both distributed active gain and random distributed Rayleigh feedback, so as to achieve an effect that both the distributed active gain and the random distributed Rayleigh feedback are simultaneously provided using a single type of fiber. The present invention adopts the distributed active gain, compared with the existing random fiber laser based on Raman gain, the present invention significantly reduces the lasing threshold of the first-order laser; due to the larger core diameter of the double-cladding weakly ytterbium-doped fiber, the fiber nonlinear effect is effectively restricted to suppress second-order light generation, thereby obtaining the first-order random laser with higher power; and at the same time, compared with the existing random fiber lasers based on the distributed active gain which adopts writing FBG strings with random phase differences in the active fiber, the present invention reasonably designs the fiber doped with ytterbium, which is able to utilize a single type of fiber to provide feedback based on both the distributed active gain and the random distributed Rayleigh feedback, so as to provide a new method for producing random laser.

The characteristics and performance of the present invention are further described in detail in combination with the embodiments as below.

First Embodiment

A random distributed Rayleigh feedback fiber laser based on a double-cladding weakly ytterbium-doped fiber comprises: a pump laser source 1, a pump combiner 2, a cladding power stripper 4, and a double-cladding weakly ytterbium-doped fiber 3 for simultaneously achieving distributed active gain and random distributed Rayleigh feedback, wherein: an output end of the pump combiner 2 is connected with one end of the double-cladding weakly ytterbium-doped fiber 3, the other end of the double-cladding weakly ytterbium-doped fiber 3 is connected with an input end of the cladding power stripper 4; the double-cladding weakly ytterbium-doped fiber 3 comprises an outer cladding layer made from silicate, an inner cladding layer made from germanosilicate doped with a certain concentration of germanium ions, and a fiber core from outside to inside in sequence, wherein the fiber core is made from germanosilicate doped with low concentration of ytterbium ions, and a concentration of the ytterbium ions is $8 \times 10^{23}/m^3$; when the pump light with a certain power is transmitted along the fiber, the pump light does not decay rapidly with the transmission distance of the fiber, and the signal light is able to be amplified within a relatively long distance range; under the effect of the distributed gain, the sum of the backward Rayleigh scattering intensity of the long-distance fiber is able to provide adequate feedback for laser lasing; the fiber core is adapted for simultaneously achieving the distributed active gain and the random distributed Rayleigh feedback.

Second Embodiment

Based on the first embodiment, the random distributed Rayleigh feedback fiber laser further comprises an FBG 5 for enhancing laser feedback, wherein the FBG 5 is connected with a signal end of the pump combiner 2, as shown in FIG. 2.

Figure 3:
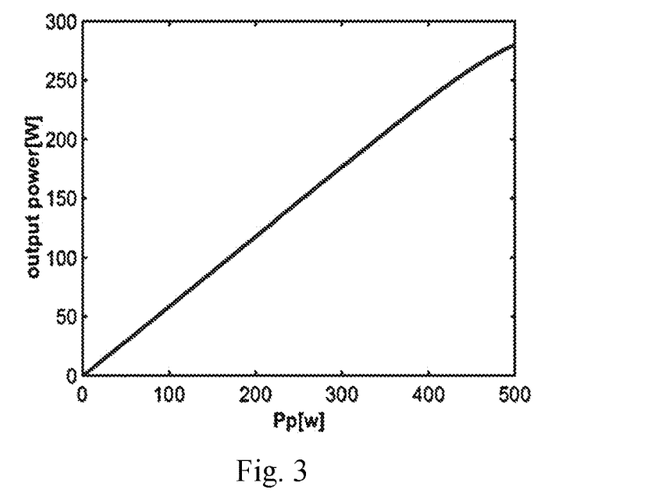
FIG. 3 is a change curve of laser output power changing with inputted pump power of the fiber laser according to the second preferred embodiment of the present invention.
Figure 4:
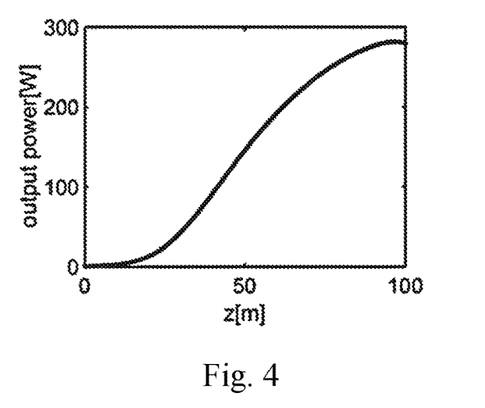
FIG. 4 is a distribution curve of the laser power distributed along a longitudinal direction of the fiber when a pump laser operating at a wavelength of 976 nm and its power is at 500 W according to the second preferred embodiment of the present invention.

The concentration of the ytterbium ions in the double-cladding weakly ytterbium-doped fiber 3 is $8 \times 10^{23}/m^3$, a wavelength of the pump laser source 1 is 976 nm, a wavelength of the FBG 5 is 1040 nm, a length of the double-cladding weakly ytterbium-doped fiber 3 is 210 m; the FBG 5 with the wavelength of 1040 nm has high reflectivity and low transmittance for the light with the wavelength of 1040 nm; the FBG has a semi-open cavity structure for enhancing the laser feedback, and simultaneously, the FBG has a narrow line width and a narrowing effect on the laser, thereby outputting a high-power random laser with a lower threshold and a narrower line width. As shown in FIG. 3, with the increase of the pump power, the laser power is also continuously increased. FIG. 4 shows a distribution curve of the laser power distributed along a longitudinal direction of the fiber when a pump laser operating at a wavelength of 976 nm and its power is at 500 W. It can be seen from FIG. 4 that the closer to the output end of the laser, the higher the laser power.

Third Embodiment

Based on the second embodiment, the wavelength of the pump laser source 1 is 976 nm, the length of the double-cladding weakly ytterbium-doped fiber 3 is 170 m, and the wavelength of the FBG 5 is 1060 nm, which is able to greatly increase the lasing efficiency of the random fiber laser operating at the 1060 nm wavelength.

Fourth Embodiment

Based on the first embodiment, the FBG 5 is connected with an output end of the cladding power stripper 4 for forming a semi-open cavity structure based on backward pump, as shown in FIG. 5, the wavelength of the pump laser source 1 is 976 nm, the length of the double-cladding weakly ytterbium-doped fiber 3 is 200 m, and the wavelength of the FBG 5 is 1080 nm.

Fifth Embodiment

Based on the first embodiment, as shown in FIG. 6, an FBG-A 6 and an FBG-B 7 are connected with the pump combiner 2 for forming a first-order second-order laser semi-open cavity structure to enhance first-order second-order feedback and reduce second-order laser lasing threshold; a signal end of the pump combiner 2 is connected with one end of the FBG-A 6, the other end of the FBG-A 6 is connected with the FBG-B 7, an output end of the pump combiner 2 is connected with one end of the double-cladding weakly ytterbium-doped fiber 3, the other end of the double-cladding weakly ytterbium-doped fiber 3 is connected with an input end of the cladding power stripper 4.

The length of the double-cladding weakly ytterbium-doped fiber 3 is 600 m, the wavelength of the FBG-A 6 is 1050 nm, and the wavelength of the FBG-B 7 is 1100 nm.

Figure 7:
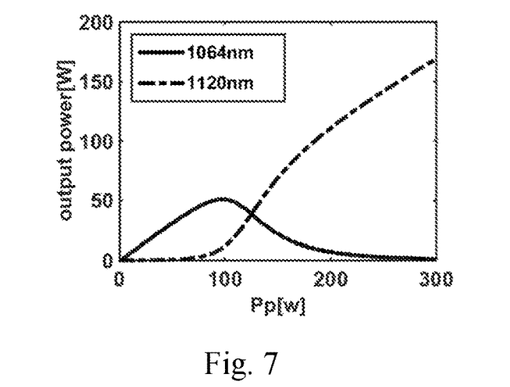
FIG. 7 is a change curve of laser output power changing with inputted pump power of the fiber laser according to the fifth preferred embodiment of the present invention.
Figure 8:
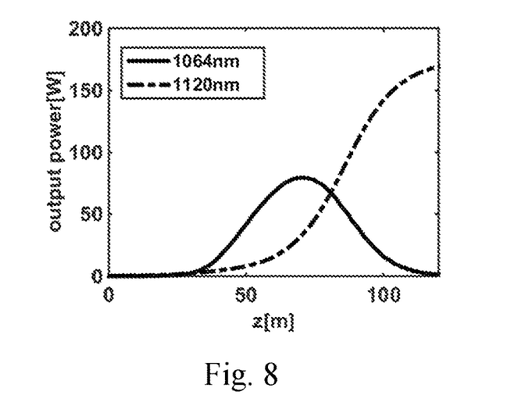
FIG. 8 is a distribution curve of the laser power distributed along a longitudinal direction of the fiber when a pump laser operating at a wavelength of 976 nm and its power is at 300 W according to the fifth preferred embodiment of the present invention.

A backward output end of the random distributed Rayleigh feedback fiber laser based on the double-cladding weakly ytterbium-doped fiber, according to the first embodiment of the present invention, is connected with the FBG-A 6 with the wavelength of 1050 nm and the FBG-B 7 with the wavelength of 1100 nm to respectively provide feedback for first-order random laser and second-order random laser. When adequate pump light with the wavelength of 976 nm is introduced into the double-cladding weakly ytterbium-doped fiber 3 for satisfying first-order random laser conditions, the first-order laser is produced and transmitted in the fiber core; when the power of the pump light with the wavelength of 976 nm is further increased, the power of the first-order laser is also increased to a certain power, so as to produce a stimulated Raman effect in the double-cladding weakly ytterbium-doped fiber 3 for producing second-order laser, the second-order laser is simultaneously amplified by ytterbium ions and Raman gain to produce the second-order random laser with lower threshold and higher efficiency. FIG. 7 shows a power change curve of the outputted first-order and second-order laser changing with the pump power of the fiber laser, in which with the increase of the pump power, the first-order laser is rapidly increased for satisfying first-order random laser conditions, and then the first-order laser is produced, the energy of the first-order laser is rapidly decreased and the energy of the second-order laser is rapidly increased. FIG. 8 is a distribution curve of the first-order and second-order laser power distributed along a longitudinal direction of the fiber when a pump power of the fiber laser is 300 W, in which from the pump input end to the laser output end, the first-order laser power is gradually increased and then decreased with the transmission distance till finally completely exhausted, and however, the second-order laser is rapidly increased with the decrease of the first-order laser and reaches a maximum at the output end of the laser.

Sixth Embodiment

Based on the fifth embodiment, the wavelength of the FBG-A 6 is 1040 nm, the wavelength of the FBG-B 7 is 1070 nm, the FBG-A 6 with the wavelength of 1040 nm has high reflectivity and low transmittance for the light with the wavelength of 1040 nm, the FBG-B 7 with the wavelength of 1070 nm has high reflectivity and low transmittance for the light with the wavelength of 1070 nm, so as to greatly improve the lasing efficiency of the random fiber laser operating at the 1070 nm wavelength.

Seventh Embodiment

A random distributed Rayleigh feedback fiber laser based on a double-cladding weakly ytterbium-doped fiber with a larger core diameter comprises: a pump laser source 1, a pump combiner 2 and a cladding power stripper 4, wherein an output end of the pump laser source 1 is connected with a pump input end of the pump combiner 2, an output end of the cladding power stripper 4 acts as a frontward output end of the laser, and a signal end of the pump combiner 2 acts as a backward output end of the laser; the laser further comprises a double-cladding weakly ytterbium-doped fiber 3 with a larger core diameter and an FBG 5, wherein: an output end of the pump combiner 2 is connected with one end of the double-cladding weakly ytterbium-doped fiber 3 with the larger core diameter, the other end of the double-cladding weakly ytterbium-doped fiber 3 with the larger core diameter is connected with an input end of the cladding power stripper 4, and a signal end of the pump combiner 2 is connected with the FBG 5, as shown in FIG. 9, the double-cladding weakly ytterbium-doped fiber 3 with the larger core diameter comprises a fiber core and a cladding layer from inside to outside in sequence.

The concentration of ytterbium ions in the double-cladding weakly ytterbium-doped fiber 3 with the larger core diameter is $8 \times 10^{25}/m^3$, the length of the double-cladding weakly ytterbium-doped fiber 3 with the larger core diameter is 800 m, a diameter of the fiber core is 25 μm, a diameter of the cladding layer is 400 μm, and the wavelength of the FBG 5 is 1060 nm.

Through the double-cladding weakly ytterbium-doped fiber 3 with the larger core diameter, the pump power coupled in the fiber is increased, the usage efficiency of the ytterbium ions in the double-cladding weakly ytterbium-doped fiber 3 is improved, so that the laser efficiency of the random laser is increased, and the production of the second-order random laser is further restricted by the area of the double-cladding weakly ytterbium-doped fiber 3, so as to output the first-order random laser with higher efficiency.

The above is only the preferred embodiments of the present invention, and is not intended to limit the present invention. Any modifications, equivalent substitutions and improvements made within the spirit and principles of the present invention should be included in the protective scope of the present invention.

What is claimed is:

1. A random distributed Rayleigh feedback fiber laser based on a double-cladding ytterbium-doped fiber, which comprises: a pump laser source (1), a pump combiner (2), a cladding power stripper (4), and a double-cladding ytterbium-doped fiber (3) for simultaneously achieving distributed active gain and random distributed Rayleigh feedback, wherein:

the pump laser source (1) is connected with an input end of the pump combiner an output end of the pump combiner (2) is connected with one end of the double-cladding ytterbium-doped fiber (3), the other end of the double-cladding ytterbium-doped fiber (3) is connected with an input end of the cladding power stripper (4), the double-cladding ytterbium-doped fiber (3) comprises an outer cladding layer, an inner cladding layer, and a fiber core from outside to inside in sequence; and a concentration of ytterbium ions in the double-cladding ytterbium-doped fiber (3) is in a range of $0.5 \times 10^{23}$ to $1 \times 10^{25}/m^3$;

the random distributed Rayleigh feedback fiber laser further comprises an FBG-A (6) and an FBG-B (7), wherein the FBG-A (6) and random Rayleigh scattering in the double-cladding ytterbium-doped fiber (3) form a first-order semi-open cavity structure, the FBG-B (7) and the random Rayleigh scattering in the double-cladding ytterbium-doped fiber (3) form a second-order semi-open cavity structure, so as to enhance first-order second-order feedback; a signal end of the pump combiner (2) is connected with one end of the FBG-A (6), the other end of the FBG-A (6) is connected with the FBG-B (7).

2. The random distributed Rayleigh feedback fiber laser based on the double-cladding ytterbium-doped fiber, as recited in claim 1, wherein: a length of the double-cladding ytterbium-doped fiber (3) is in a range of 100 to 3000 m, a wavelength of the FBG-A (6) is in a range of 1015 to 1150 nm, and a wavelength of the FBG-B (7) is in a range of 1065-1300 nm.

3. A random distributed Rayleigh feedback fiber laser based on a double-cladding ytterbium-doped fiber, which comprises: a pump laser source (1), a pump combiner (2), a cladding power stripper (4), a double-cladding ytterbium-doped fiber (3), and an FBG (Fiber Bragg Grating) (5), wherein: an output end of the cladding power stripper (4) acts as a frontward output end of the laser, and a signal end of the pump combiner (2) acts as a backward output end of the laser; the pump laser source (1) is connected with an input end of the pump combiner (2), an output end of the pump combiner (2) is connected with one end of the double-cladding ytterbium-doped fiber (3), the other end of the double-cladding ytterbium-doped fiber (3) is connected with an input end of the cladding power stripper (4), and the signal end of the pump combiner (2) is connected with the FBG the double-cladding ytterbium-doped fiber (3) comprises a fiber core and a cladding layer from inside to outside in sequence, a diameter of the fiber core is in a range of 15-30 μm, a diameter of the cladding layer is in a range of 125-600 pan; a length of the double-cladding ytterbium-doped fiber (3) is in a range of 200 to 1000 m; a wavelength of the FBG (5) is in a range of 1015 to 1150 nm; and a concentration of ytterbium ions in the double-cladding ytterbium-doped fiber is in a range of $8 \times 10^{25}$-$1 \times 10^{27}/m^3$.

* * * * *